US012761973B2

(12) United States Patent
Sun et al.

(10) Patent No.: US 12,761,973 B2
(45) Date of Patent: Oct. 13, 2026

(54) TECHNIQUES FOR MEMORY ACCESS MANAGEMENT IN DISTRIBUTED COMPUTING ARCHITECTURES

(71) Applicant: Cisco Technology, Inc., San Jose, CA (US)

(72) Inventors: Yang Sun, Hangzhou (CN); Bruce Chen, Shanghai (CN); Davy Gu, Shanghai (CN); Alvin Li, Shanghai (CN); Bo Liu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 18/341,656

(22) Filed: Jun. 26, 2023

(65) Prior Publication Data

US 2024/0427641 A1 Dec. 26, 2024

(51) Int. Cl.

| | |
|---|---|
| ***G06F 9/50*** | (2006.01) |
| ***G06F 12/0811*** | (2016.01) |
| ***G06F 12/0813*** | (2016.01) |
| ***G06F 15/173*** | (2006.01) |

(52) U.S. Cl.

CPC .......... *G06F 9/5072* (2013.01); *G06F 9/5027* (2013.01); *G06F 9/5077* (2013.01); *G06F 12/0811* (2013.01); *G06F 12/0813* (2013.01); *G06F 15/17331* (2013.01); *G06F 2212/1016* (2013.01); *G06F 2212/1024* (2013.01); *G06F 2212/2542* (2013.01); *G06F 2212/502* (2013.01)

(58) Field of Classification Search

CPC .... G06F 9/5072; G06F 9/5027; G06F 9/5077; G06F 12/0811; G06F 12/0813; G06F 2212/1016; G06F 2212/1024; G06F 2212/2542; G06F 2212/502; G06F 15/17331

See application file for complete search history.

(56) References Cited

U.S. PATENT DOCUMENTS 10,657,060 B1 * 5/2020 Robinson ............ G06F 15/7867
2009/0157986 A1 * 6/2009 Kim ...................... G06F 3/0629 711/E12.001
2012/0124323 A1 5/2012 Lu et al.

(Continued)

FOREIGN PATENT DOCUMENTS

WO WO2009036987 A2 3/2009

*Primary Examiner* — Michael W Ayers
(74) *Attorney, Agent, or Firm* — Lee & Hayes, P.C.

(57) ABSTRACT

Techniques for memory access management in a distributed computing system are described herein. In some aspects, the techniques described herein relate to a method for memory access management in a distributed computing system, where the method includes: receiving a first request to execute a first operation using a distributed architecture and in a uniform memory access (UMA) mode, wherein the distributed architecture comprises a first processor, a first memory that is local to the first processor, and a second memory that is remote to the first processor; subsequent to receiving the first request and a first delay period, transmitting first data associated with the first operation to the first processor, wherein the first data is stored in the first memory; and subsequent to receiving the first request, transmitting second data associated with the first operation to the first processor, wherein the second data is stored in the second memory.

20 Claims, 8 Drawing Sheets

400

(56) References Cited

U.S. PATENT DOCUMENTS

| | | | | |
|---|---|---|---|---|
| 2013/0152086 | A1* | 6/2013 | Yoo | G06F 9/455<br>718/1 |
| 2014/0351546 | A1 | 11/2014 | Lichmanov et al. | |
| 2016/0170886 | A1* | 6/2016 | Ma | G06F 12/0811<br>711/122 |
| 2020/0004711 | A1 | 1/2020 | Jiang et al. | |
| 2020/0192831 | A1* | 6/2020 | Lim | G06F 13/1663 |
| 2021/0208819 | A1* | 7/2021 | Hou | G06F 3/0679 |
| 2021/0263673 | A1 | 8/2021 | Norman | |
| 2022/0004439 | A1* | 1/2022 | Abraham | G06F 9/5066 |
| 2022/0179789 | A1* | 6/2022 | Lee | G06F 12/0284 |

* cited by examiner

500

600

```
{
  "APPLICATION_NAME": "EXAMPLE_APP",
  "NUMA_OPERATIONS": [
    {
      "OPERATION_NAME": "NUMA_OP_1",
      "MEMORY_NODE": 0,
      "PROCESSOR_NODE": 0
    },
    {
      "OPERATION_NAME": "NUMA_OP_2",
      "MEMORY_NODE": 1,
      "PROCESSOR_NODE": 0
    }
  ],
  "UMA_OPERATIONS": [
    {
      "OPERATION_NAME": "UMA_OP_1",
      "PROCESSOR_CORE": 0
    },
    {
      "OPERATION_NAME": "UMA_OP_2",
      "PROCESSOR_CORE": 1
    }
  ]
}
```

FIG. 6

TECHNIQUES FOR MEMORY ACCESS MANAGEMENT IN DISTRIBUTED COMPUTING ARCHITECTURES

TECHNICAL FIELD

The present invention relates generally to data retrieval and memory access management in distributed computing systems. More specifically, the invention pertains to a method for executing operations in a distributed architecture using uniform memory access (UMA), non-uniform memory access (NUMA), or a hybrid mode, to optimize memory access and system performance according to the specific requirements of the application.

BACKGROUND

Distributed computing systems often consist of multiple processors and memory units that work together to execute complex operations and applications. Memory access patterns and management can significantly impact the efficiency and performance of such systems. Two common memory access models used in multiprocessor systems are uniform memory access (UMA) and non-uniform memory access (NUMA).

In the UMA model, all processors share a common memory pool with uniform access time, ensuring that each processor can access any memory location with equal latency, regardless of the processor's physical location or the location of the memory. While this model simplifies memory access management, it can also result in suboptimal performance due to potential memory access bottlenecks.

In contrast, the NUMA model assigns local memory to each processor, allowing faster access to local memory compared to remote memory associated with other processors. This model can lead to improved performance and memory access efficiency in certain situations. However, NUMA systems can also introduce complexity in managing data sharing and communication between processors.

There is a need for an improved method for memory access management in distributed computing systems that avoids the shortcomings of both UMA and NUMA models, providing greater efficiency in managing memory access and system performance tailored to the specific requirements of each operation or application.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 provides an operational example of a data structure that represents a software application with some operations performed in the NUMA mode and other operations performed in the UMA mode.

DESCRIPTION OF EXAMPLE EMBODIMENTS

Overview

Figure 1:
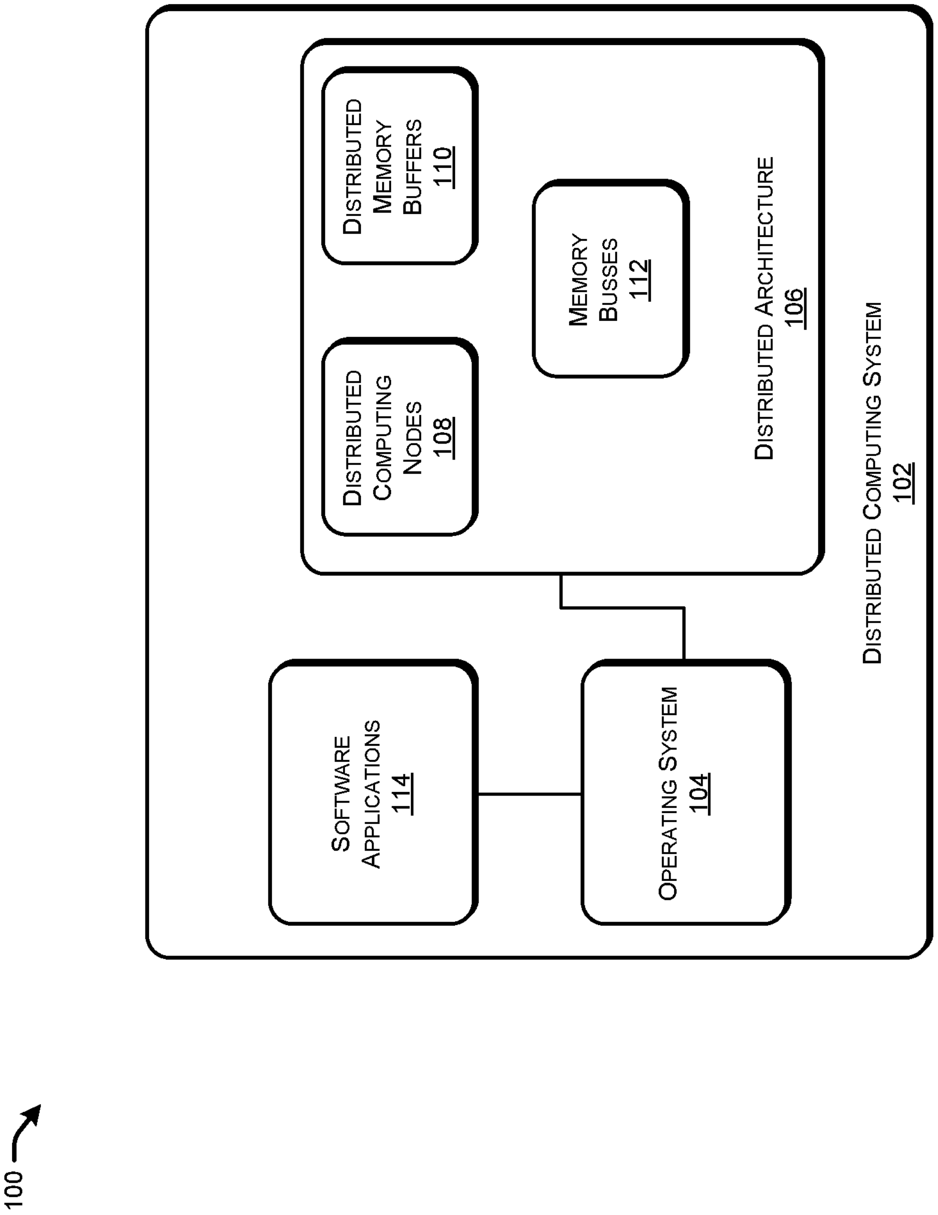
FIG. 1 provides an example architecture for a distributed computing system.

This disclosure describes techniques for memory access management in a distributed computing system. In some aspects, the techniques described herein relate to a method for memory access management in a distributed computing system, where the method includes: receiving a first request to execute a first operation using a distributed architecture and in a uniform memory access (UMA) mode, wherein the distributed architecture comprises a first processor, a first memory that is local to the first processor, and a second memory that is remote to the first processor; subsequent to receiving the first request and a first delay period, transmitting first data associated with the first operation to the first processor, wherein the first data is stored in the first memory; and subsequent to receiving the first request, transmitting second data associated with the first operation to the first processor, wherein the second data is stored in the second memory.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for memory access management in a distributed computing system. In some cases, the techniques described herein enable executing operations in a distributed architecture using uniform memory access (UMA), non-uniform memory access (NUMA), or a hybrid mode. This approach provides greater flexibility and efficiency in managing memory access and system performance, tailoring the mode of operation to the specific requirements of the application.

In some cases, the techniques described herein include executing operations using a distributed architecture with UMA or NUMA modes. In some cases, a request is received to execute an operation in UMA mode on a distributed architecture comprising a first processor, a local memory, and a remote memory. After a delay period, data associated with the operation is transmitted to the first processor and stored in both local and remote memories. The first delay period may be determined based on the latency associated with data transmission from local and remote memories to the first processor. In some cases, the techniques include executing a second operation using the distributed architecture in NUMA mode. Following the receipt of a request for this operation, data is transmitted to the first processor without the delay period. In some cases, the techniques described herein include executing application operations in either UMA or NUMA mode, depending on the requirements of the application. A single application may have operations executed in both UMA and NUMA modes, providing flexibility in managing memory access and system performance.

In some cases, the techniques described herein enable data retrieval in a distributed computing system that enable executing operations using a UMA mode, a NUMA mode, or a hybrid mode. This approach may increase flexibility and efficiency in managing memory access and system performance, adapting the mode of operation to the application's specific requirements. In some cases, in the UMA mode, the distributed architecture mimics the behavior of a UMA memory system where all processors share a common memory pool with uniform access time. Conversely, in the NUMA mode, memory access times may depend on the memory location and the processor accessing the memory, resulting in faster access to local memory. In some cases, the hybrid mode allows the application or the operating system to decide whether to execute each operation in the NUMA mode or the UMA mode based on the specific requirements of the operation. It combines the benefits of both UMA and NUMA modes, adapting to the varying demands of the application or the system. The flexibility to choose between the UMA and NUMA modes enables the system to optimize performance based on the specific requirements of each operation, resulting in more efficient memory access and potentially improved overall system performance.

In some cases, the techniques described herein relate to a distributed architecture with a set of distributed computing nodes and/or a set of distributed memory buffer. Each distributed computing node may include a set of distributed processors, local memory units for data storage and processing, and local memory controllers for managing data access in local memory units. Distributed memory buffers may serve as intermediary storage units between computing nodes and contain their own local memory units and local memory controllers. In some cases, to enable data transfer between components, the architecture uses memory buses as communication channels. Local memory controllers may manage data access and transfer within the distributed architecture. These controllers may access data stored in their respective local memory units and control data transfer between memory units, memory buses, and distributed processors. In some cases, when a system has at least one memory buffer and at least two processors each with at least one local memory, then there may be three types of delayed transmission effects: (i) delay to access local memory by a processor, (ii) delay to access local memory of another processor, and (iii) delay to access memory of a remote buffer.

In some cases, the techniques described herein relate to performing data retrieval in a distributed architecture according to a UMA mode. In some cases, in the UMA mode, a distributed architecture mimics the behavior of a UMA memory architecture where all processors in a multiprocessor system share a common memory pool with uniform access time. Each processor can access any memory location with equal latency, regardless of the processor's physical location or the location of the memory. When operating in UMA mode, local memory retrievals may include a delay to ensure that the processor receives local and remote memory retrievals at the same time. In some cases, while operating in UMA mode, the architecture adjusts latency in local memory retrieval to ensure that the retrieval takes the same time as retrieval from a remote memory unit, exhibiting UMA behavior.

In some cases, the techniques described herein relate to performing data retrieval in a distributed architecture according to a NUMA mode. In some cases, in the NUMA mode, the distributed architecture mimics the behavior of a NUMA memory architecture, where memory access times depend on the memory location and the processor accessing the memory. Each processor has its local memory, which it can access faster than remote memory associated with other processors. In some cases, in the NUMA mode, there is no need to ensure that the processor receives local and remote memory retrievals at the same time, so data is retrieved without delay.

In some cases, the techniques described herein relate to performing data retrieval in a distributed architecture according to a hybrid model. In some cases, in the hybrid mode, the distributed architecture allows the application or the operating system to decide whether to execute each operation in the NUMA mode or in the UMA mode based on the specific requirements of the operation. In some cases, the hybrid mode combines the benefits of both UMA and NUMA modes, adapting to the varying demands of the application or the system. In some cases, in the hybrid mode, the flexibility to choose between the UMA and NUMA modes enables the system to optimize performance based on the specific requirements of each operation. This results in more efficient memory access and potentially improved overall system performance.

In some cases, in the hybrid mode, an operating system or an application must first analyze each operation, assessing its requirements and characteristics such as memory access patterns, processor locality, data sharing, and communication between processors. Based on this analysis, the system decides whether to execute the operation in the NUMA mode or the UMA mode, choosing the NUMA mode for operations that require fast access to local memory and minimal communication between processors, and the UMA mode for operations that require uniform memory access across all processors and frequent data sharing. Once the appropriate mode is determined, the operating system configures the distributed computing system accordingly, setting uniform access latency for both local and remote memory retrievals in UMA mode and allowing for faster access to local memory and variable access latency for remote memory in NUMA mode. The operation is then executed in the chosen mode, taking advantage of either uniform memory access or faster local memory access. Throughout the process, the system continuously monitors the performance of the executed operation, evaluating the efficiency and effectiveness of the chosen mode and, if necessary, switching between the UMA and NUMA modes during runtime to adapt to changes in the application's demands or system conditions.

In some cases, the techniques described herein enable improve memory access efficiency. In some cases, the techniques described herein enable the selection of the most suitable memory access mode (UMA, NUMA, or hybrid) based on the specific requirements of the operation, optimizing memory access and reducing latency. In UMA mode, uniform access time is ensured for all processors, whereas in NUMA mode, faster access to local memory is achieved. By choosing the most appropriate mode for a given operation, the system can minimize memory access bottlenecks and improve overall computational efficiency.

In some cases, the techniques described herein enable enhanced system performance in a distributed computing system. In some cases, the ability to switch between UMA, NUMA, and hybrid modes based on the application's demands or system conditions enables the system to adapt and optimize performance based on each operation's requirements. This adaptability results in better resource allocation and usage, reducing potential performance issues due to non-optimal memory access patterns. Accordingly, the techniques described herein lead to improved overall system performance, contributing to faster execution times and more efficient resource utilization.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 provides an example architecture 100 for a distributed computing system 102. The distributed computing system 102 may be designed to efficiently and effectively process, store, and/or present data using a distributed architecture 106. The distributed computing system 102 may include an operating system 104, a set of software applications 114, and a distributed architecture 106. The distributed architecture 106 may include a set of distributed computing nodes 108, a set of distributed memory buffers 110, and a set of memory busses 112.

The operating system 104 may be a software component that manages the hardware and software resources of the distributed computing system 102. The operating system may operate as an intermediary between the software applications 114 and the distributed architecture 106, facilitating efficient communication and data exchange between them. The operating system 104 may be implemented using a variety of existing or custom operating systems such as Linux, Windows, or macOS, or any other suitable operating system capable of handling distributed computing workloads. The operating system 104 may include features such as process management, memory management, file system management, and networking capabilities to support the efficient functioning of the distributed computing system 102. In some cases, the operating system 104 serves the backbone for managing hardware resources, software applications, and providing essential services to facilitate communication and coordination among the distributed components of the distributed computing system 102.

In some cases, each distributed computing node 108 may have its own operating system installed, and the operating system on each node would execute on that node's hardware. In some cases, the distributed architecture 100 uses a virtualization technology such as containerization or hypervisors. In some of such cases, the operating system 104 could be running in a virtual machine or a container that is hosted on a physical machine. The virtual machine or container may be located on any distributed computing node 108 in the distributed architecture 106, and the operating system 104 may execute within the virtualized machine or container. In some cases, the operating system 104 itself is distributed, with different parts of the operating system 104 executing on different distributed computing nodes 108 in the distributed architecture 106.

The software applications 114 may include various programs and tools designed to execute specific tasks within the distributed computing system 102. These software applications 114 may be written in various programming languages, such as C, C++, Java, Python, or any other suitable language. The software applications 114 may be tailored to the requirements of the particular distributed computing system 102, and may include data processing applications, analytics tools, machine learning algorithms, and other applications that may benefit from the distributed architecture 106. The software applications 114 may interact with the operating system 104 to access the resources provided by the distributed architecture 106.

The distributed architecture 106 may be the foundation of the distributed computing system 102 and may be responsible for enabling efficient processing and storage of data. The distributed architecture 106 may include a set of distributed computing nodes 108, a set of distributed memory buffers 110, and a set of memory busses 112.

The set of distributed computing nodes 108 may be the primary processing units within the distributed architecture 106. Each computing node 108 may be implemented using various hardware components, such as central processing units (CPUs), graphics processing unit (GPUs), or field-programmable gate arrays (FPGAs), depending on the processing requirements of the distributed computing system 102. The distributed computing nodes 108, 110, 112 may be arranged in a variety of topologies, such as a mesh, tree, or hypercube configuration, to optimize communication and processing efficiency. Each distributed computing node 108 may be configured to execute parts of the software applications 114 and may communicate with other distributed computing nodes 108 and/or memory buffers 110 via the memory busses 112.

In some cases, the distributed memory buffers 110 may store data temporarily before transferring it to the computing nodes 108 for processing or to other distributed memory buffers 110 for further storage or communication. The distributed memory buffers 110 may be distributed across the distributed architecture 106 to balance data storage and transfer loads and reduce latency.

The memory busses 112 may communication channels that enable data exchange between the distributed computing nodes 108 and/or between the distributed computing nodes 108 and distributed memory buffers 110. The memory busses may be implemented using a variety of communication technologies, such as copper-based interconnects, optical interconnects, or even wireless communication, depending on the requirements and constraints of the distributed computing system 102.

In some cases, the memory busses 112 may enable fast and reliable communication and data exchange between the distributed computing nodes 108 and/or between the distributed computing nodes 108 and distributed memory buffers 110, facilitating efficient processing and storage of data within the distributed architecture 106. The memory busses 112 may be organized in different topologies, such as point-to-point, ring, or switched fabric, to optimize communication and data transfer between the distributed computing nodes 108 and/or between the distributed computing nodes 108 and distributed memory buffers 110.

In some cases, the distributed computing system 102 efficiently and effectively processes and stores data through the integration of the operating system 104, the set of software applications 114, and the distributed architecture 106. In some cases, the operating system 104 manages hardware and software resources, while the software applications 114 perform specific tasks and interact with the distributed architecture 106 through the operating system 104. The distributed computing nodes 108 execute parts of the software applications 114 and communicate with other nodes and memory buffers 110 via the memory busses 112. The distributed memory buffers 110 provide intermediate data storage and transfer capabilities within the distributed architecture 106. By carefully selecting and implementing appropriate technologies for each component, the distributed computing system 102 may deliver efficient and reliable processing and storage capabilities for a wide range of applications.

Figure 2:
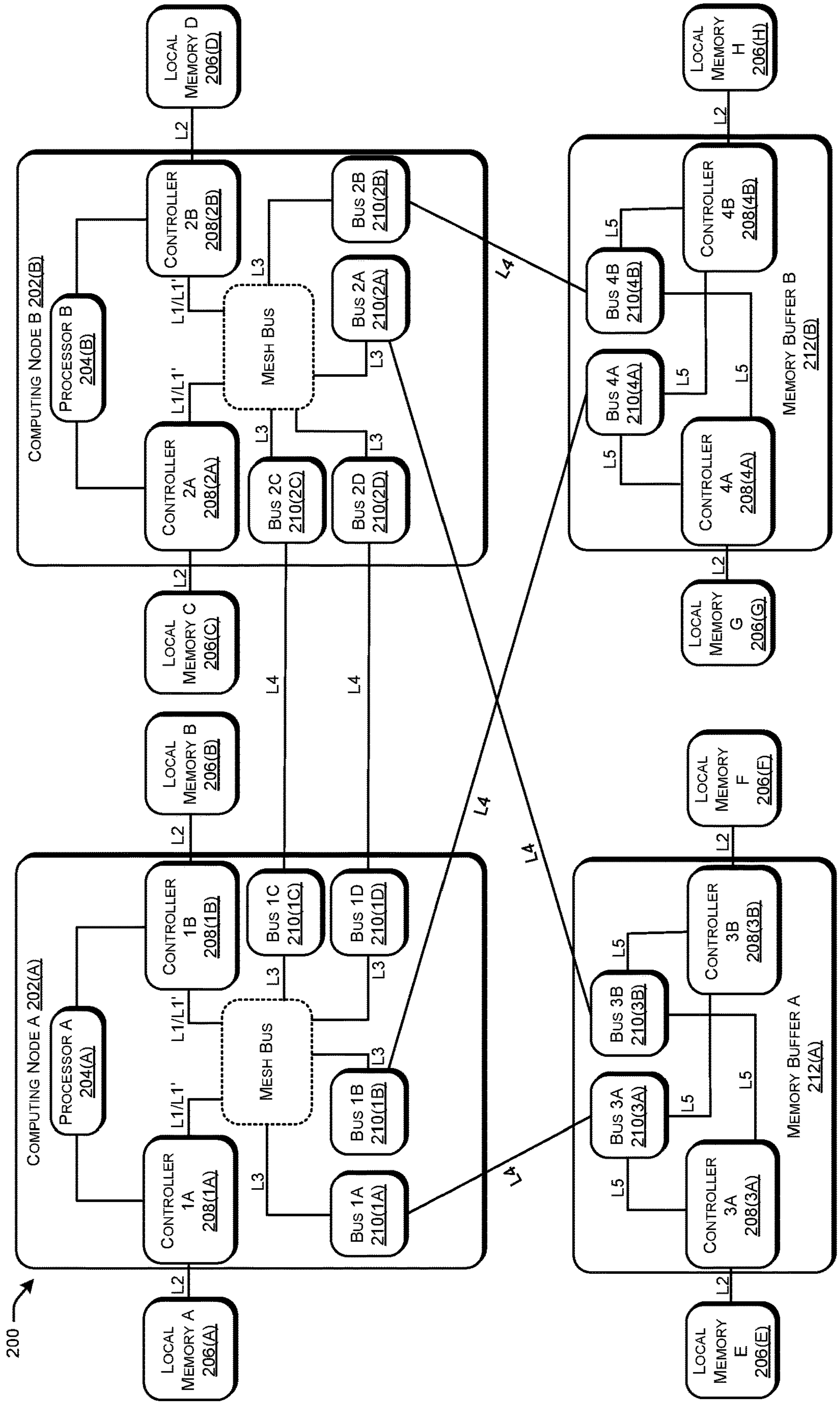
FIG. 2 provides an example of a distributed architecture that includes two distributed computing nodes that can each directly access both of two distributed memory buffers.

FIG. 2 provides an example of a distributed architecture 200 that includes two distributed computing nodes 202 and two distributed memory buffers 212. However, a person of ordinary skill in the relevant technology will recognize that any number of distributed computing nodes and/or distributed memory buffers may be utilized in a distributed architecture.

A distributed computing node 202 may be a processing unit in the distributed architecture 200. Each distributed computing node 202 may have a set of distributed processors 204 and/or a set of local memory units 206 for storing and/or processing data. The local memory units 206 may be implemented using a variety of technologies using a variety of technologies such as SRAM, DRAM, or non-volatile memory (NVM) depending on the requirements of the underlying software application. A local memory unit 206 may be a cache or main memory within a distributed computing node 202. Each distributed computing node 202 may also have a set of local memory controllers 208 responsible for managing data access in its local memory units 206. The local memory controllers 208 may be implemented as part of the distributed processors 204 or as separate chips to enable efficient data access and management in the local memory units 206. In some cases, a local memory unit 206 is a Dual In-line Memory Module (DIMM).

Distributed memory buffers 212 may serve as intermediary storage units between the distributed computing nodes 202. Each distributed memory buffer 212 may have a set of local memory units 206, which may store data temporarily before transferring it to the distributed computing nodes 202 or other distributed memory buffers 212. The local memory units 206 in the distributed memory buffers 212 may be implemented using similar memory technologies as the local memory units 206 in the distributed computing nodes 202. Like a distributed computing node 202, a distributed memory buffer 212 may also have a set of local memory controllers 208 to manage data access within the local memory units 206 of the distributed memory buffer 212. The local memory controllers 208 for a distributed memory buffer 212 may be implemented as separate chips, ensuring efficient and reliable data access and management within the distributed memory buffer 212.

To facilitate data transfer between the computing nodes and memory buffers, the distributed architecture 200 may include a set of memory buses 210 associated with each component. Memory buses 210 may be the communication channels that enable data exchange between the computing distributed nodes 202, between the distributed computing nodes 202 and distributed memory buffers 212, and/or between the distributed memory buffers 212. In some cases, each memory bus 210 of a distributed node 202 connects the distributed computing node 202 to another distributed computing node 202 or one of the distributed memory buffers 212, and each memory bus 210 of a distributed memory buffer 212 connects the distributed memory buffer 212 to one of the distributed computing nodes 202. A memory bus 210 may be implemented using a variety of technologies, such as copper-based interconnects, optical interconnects, or even wireless communication depending on the requirements and constraints of the distributed architecture 200.

In some cases, the local memory controllers 208 of the distributed computing nodes 202 and the distributed memory buffers 212 play a crucial role in managing data access and transfer within the distributed architecture 200. Each local memory controller 208 in a distributed computing node 202 may be used to access data stored in one of the local memory units 206 of the distributed computing node 202, while each local memory controller 208 in a distributed memory buffer 212 may be used to access data stored in one of the local memory units 206 of the distributed memory buffer 212. Local memory controllers 208 may be implemented as separate chips or as part of a larger integrated circuit, such as a System-on-Chip (SoC). Local memory controllers 208 may be configured to perform read and write operations, handle memory addressing, and control the data transfer between the local memory units 206 and the memory buses 210 and/or between the local memory units 206 and the distributed processors 204.

In the distributed architecture 200 of FIG. 2, each distributed computing node 202 includes a distributed processor 204. For example, as depicted in FIG. 2, the distributed computing node A 202(A) includes the distributed processor A 204(A) and the distributed computing node B 202(B) includes the distributed processor B 204(B). However, a person ordinary skill in the relevant technology will recognize that a distributed computing node may include any number of distributed processors.

In the distributed architecture 200 of FIG. 2, each distributed computing node 202 is associated with two local memory units 206 each accessible by the distributed computing node 202 via a respective local memory controller 208. For example, as depicted in FIG. 2, the distributed computing node A 202(A) is associated with a local memory unit A 206(A) that the distributed computing node A 202(A) may access via a local memory controller 1A 208(1A), as well as a local memory unit B 206(B) that the distributed computing node A 202(A) may access via a local memory controller 1B 208(1B). As another example, as depicted in FIG. 2, the distributed computing node B 202(B) is associated with a local memory unit C 206(C) that the distributed computing node B 202(B) may access via a local memory controller 2A 208(2A), as well as a local memory unit D 206(D) that the distributed computing node B 202(B) may access via a local memory controller 2B 208(2B). However, a person ordinary skill in the relevant technology will recognize that a distributed computing node may include any number of local memory units and/or any number of local memory controllers.

In the distributed architecture 200 of FIG. 2, each distributed computing node 202 includes four memory busses 210 that each enables the distributed computing node 202 to transmit data to or from another distributed computing node or from a distributed memory buffer 212. For example, as depicted in FIG. 2, the distributed computing node A 202(A) includes a memory bus 1A 210(1A) that enables the distributed computing node A 202(A) to retrieve data from the distributed memory buffer A 212(A), a memory bus 1B 210(1B) that enables the distributed computing node A 202(A) to retrieve data from the distributed memory buffer B 212(B), a memory bus 1C 210(1C) that enables the distributed computing node A 202(A) to retrieve data from the distributed computing node B 202(B), and a memory bus 1D 210(1D) that enables the distributed computing node A 202(A) to transmit data to the distributed computing node B 202(B). As another example, as depicted in FIG. 2, the distributed computing node B 202(B) includes a memory bus 2A 210(2A) that enables the distributed computing node B 202(B) to retrieve data from the distributed memory buffer A 212(A), a memory bus 2B 210(2B) that enables the distributed computing node B 202(B) to retrieve data from the distributed memory buffer B 212(B), a memory bus 2C 210(2C) that enables the distributed computing node B 202(B) to retrieve data from the distributed computing node A 202(A), and a memory bus 2D 210(2D) that enables the distributed computing node B 202(B) to transmit data to the distributed computing node A 202(A). However, a person of ordinary skill in the relevant technology will recognize that a distributed computing node may include any number of memory busses.

In the distributed architecture 200 of FIG. 2, each distributed memory buffer 212 includes two local memory units 206 each accessible by the distributed memory buffer 212 via a respective local memory controller 208. For example, as depicted in FIG. 2, the distributed memory buffer A 202(A) includes a local memory unit E 206(E) that the distributed memory buffer A 202(A) may access via a local memory controller 3A 208(3A), as well as a local memory unit F 206(F) that the distributed memory buffer A 202(A) may access via a local memory controller 3B 208(3B). As another example, as depicted in FIG. 2, the distributed memory buffer B 202(B) includes a local memory unit G 206(G) that the distributed memory buffer B 202(B) may access via a local memory controller 4A 208 (4A), as well as a local memory unit H 206(H) that the distributed memory buffer B 202(B) may access via a local memory controller 4B 208(4B). However, a person ordinary skill in the relevant technology will recognize that a distributed memory buffer may include any number of local memory units and/or any number of local memory controllers.

In the distributed architecture of FIG. 2, each distributed memory buffer 212 includes two memory busses that enable a distributed computing node 202 to retrieve data from the distributed memory buffer 212. For example, as depicted in FIG. 2, the distributed memory buffer A 212(A) includes a memory bus 3A 210(3A) that enables the distributed computing node A 202(A) to retrieve data from the distributed memory buffer A 212(A) and a memory bus 3B 210(3B) that enables the distributed computing node B 202(B) to retrieve data from the distributed memory buffer A 212(A). As another example, as depicted in FIG. 2, the distributed memory buffer B 212(B) includes a memory bus 4A 210 (4A) that enables the distributed computing node A 202(A) to retrieve data from the distributed memory buffer B 212(B) and a memory bus 4B 210(4B) that enables the distributed computing node B 202(B) to retrieve data from the distributed memory buffer B 212(B). However, a person of ordinary skill in the relevant technology will recognize that a distributed memory buffer may include any number of memory busses.

The distributed architecture 200 of FIG. 2 is a "universal access" architecture. A universal architecture may be characterized in part by universal direct access by the distributed computing nodes to the distributed memory buffers, such that each distributed computing node may access data stored by any of the distributed memory buffers without having to use memory busses associated with any other distributed computing nodes.

For example, as depicted in FIG. 2, the distributed computing node A 202(A) may: (i) access data stored by the memory buffer A 212(A) "directly" via the memory bus 1A 210(1A) associated with the distributed computing node A 202(A) and the memory bus 3A 210(3A) associated with the distributed memory buffer A 212(A) and (ii) access data stored by the memory buffer B 212(B) directly via the memory bus 1B 210(1B) associated with the distributed computing node A 202(A) and the memory bus 4A 210(4A) associated with the distributed memory buffer B 212(B). As another example, as depicted in FIG. 2, the distributed computing node B 202(B) may: (i) access data stored by the memory buffer A 212(A) directly via the memory bus 2A 210(2A) associated with the distributed computing node B 202(B) and the memory bus 3B 210(3B) associated with the distributed memory buffer A 212(A) and (ii) access data stored by the memory buffer B 212(B) directly via the memory bus 2B 210(2B) associated with the distributed computing node B 202(B) and the memory bus 4B 210(4B) associated with the distributed memory buffer B 212(B).

As depicted in FIG. 2, each link between a local memory controller 208 and a distributed processor 204 is associated with at least one of a latency of L1 or a latency of L1'. However, a person of ordinary skill in the relevant technology will recognize that different controller-processor links may have different latencies. In some cases, L1 is a latency associated with local memory retrieval in a distributed computing node 202 when the distributed architecture 200 is operating in a NUMA mode, while L1' is a latency associated with local memory retrieval in a distributed computing node 202 when the distributed architecture 200 is operating in a UMA mode.

In some cases, L1'=L3+L4+L5, so that the operating system adds a delay to local memory retrieval in a distributed computing node 202 to ensure that the local memory retrieval takes the same time as retrieval of data from a distributed memory buffer. In some cases, the described latency adjustment ensures that, even when a distributed processor retrieves data from a local memory unit, the retrieval takes the same time as retrieval of data from a remote memory unit, thus ensuring that the distributed architecture 200 exhibits UMA behavior.

As further depicted in FIG. 2, each link between a local memory controller 208 and a local memory unit 206 is associated with a latency of L2. In some cases, L2 is the latency associated with retrieval of data from a memory unit by the unit's respective memory controller. However, a person of ordinary skill in the relevant technology will recognize that different controller-memory links may have different latencies.

As further depicted in FIG. 2, each link between a distributed processor 204 and a memory bus 210 is associated with a latency of L3. In some cases, L3 is the latency associated with direct retrieval of data from a memory bus by a distributed processor. However, a person of ordinary skill in the relevant technology will recognize that different processor-bus links may have different latencies.

As further depicted in FIG. 2, each link between a pair of memory busses 210 is associated with a latency of L4. In some cases, L4 is the latency associated with direct retrieval of data associated with a first memory bus by a second memory bus. However, a person of ordinary skill in the relevant technology will recognize that different bus-bus links may have different latencies.

As further depicted in FIG. 2, each link between a memory bus 210 and a local memory controller 208 in a distributed memory buffer 212 is associated with a latency of L5. In some cases, L5 is the latency associated with direct retrieval data from a local memory controller by a memory bus. However, a person of ordinary skill in the relevant technology will recognize that different bus-controller links may have different latencies.

Figure 3:
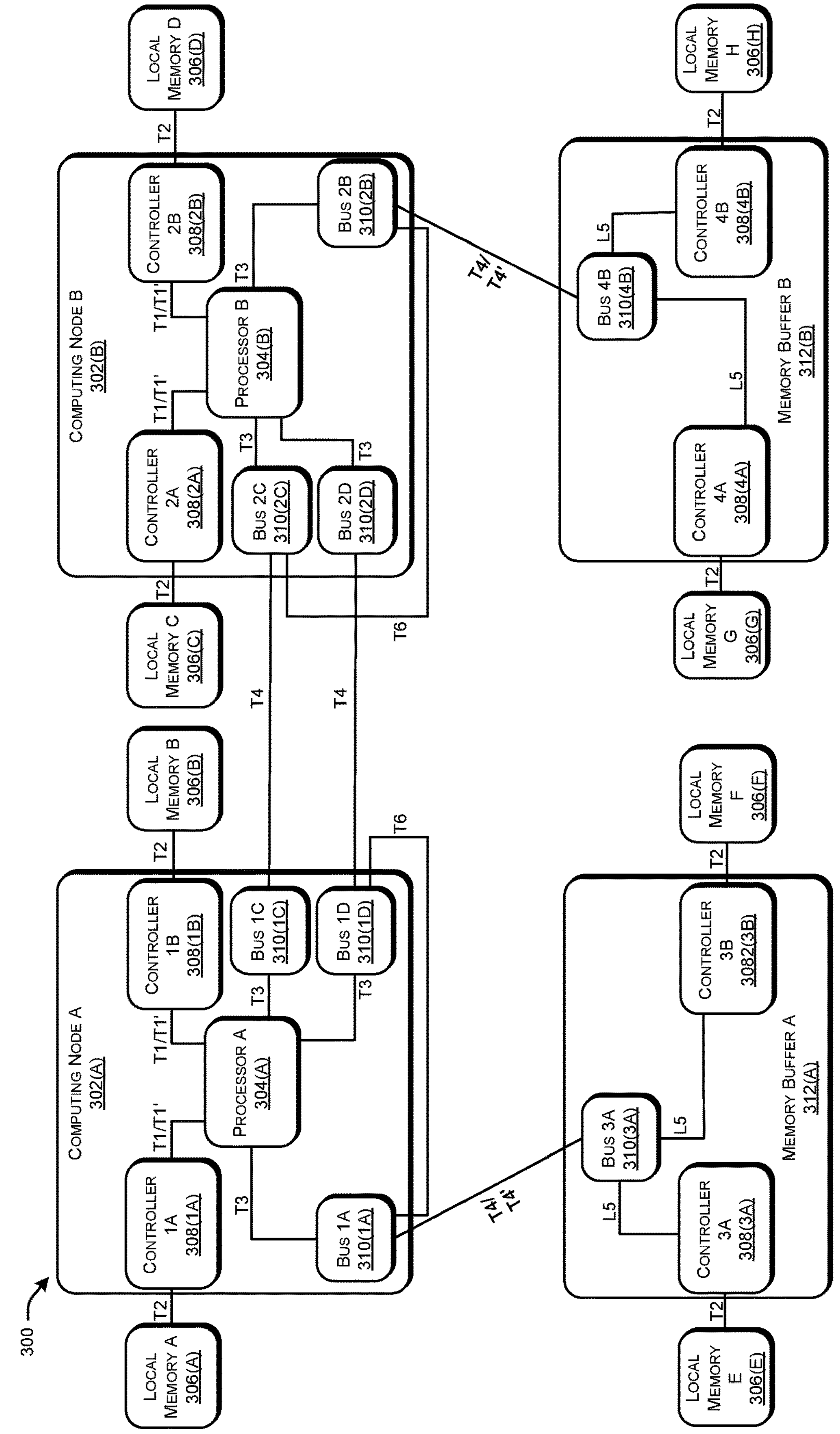
FIG. 3 provides an example of a distributed architecture that includes two distributed computing nodes that can each directly access one of two distributed memory buffers.

FIG. 3 provides an example of a distributed architecture 300 that includes two distributed computing nodes 302 and two distributed memory buffers 312. However, a person of ordinary skill in the relevant technology will recognize that any number of distributed computing nodes and/or distributed memory buffers may be utilized in a distributed architecture.

In the distributed architecture 300 of FIG. 3, each distributed computing node 302 includes a distributed processor 304. For example, as depicted in FIG. 3, the distributed computing node A 302(A) includes the distributed processor A 304(A) and the distributed computing node B 302(B) includes the distributed processor B 304(B). However, a person ordinary skill in the relevant technology will recognize that a distributed computing node may include any number of distributed processors.

In the distributed architecture 300 of FIG. 3, each distributed computing node 302 includes two local memory units 306 each accessible by the distributed computing node 302 via a respective local memory controller 308. For example, as depicted in FIG. 3, the distributed computing node A 302(A) includes a local memory unit A 306(A) that the distributed computing node A 302(A) may access via a local memory controller 1A 308(1A), as well as a local memory unit B 306(B) that the distributed computing node A 302(A) may access via a local memory controller 1B 308(1B). As another example, as depicted in FIG. 3, the distributed computing node B 302(B) includes a local memory unit C 306(C) that the distributed computing node B 302(B) may access via a local memory controller 2A 308(2A), as well as a local memory unit D 306(D) that the distributed computing node B 302(B) may access via a local memory controller 2B 308(2B). However, a person ordinary skill in the relevant technology will recognize that a distributed computing node may include any number of local memory units and/or any number of local memory controllers.

In the distributed architecture 300 of FIG. 3, each distributed computing node 302 includes three memory busses 310 that each enables the distributed computing node 302 to transmit data to or from another distributed computing node or from a distributed memory buffer 312. For example, as depicted in FIG. 3, the distributed computing node A 302(A) includes a memory bus 1A 310(1A) that enables the distributed computing node A 302(A) to retrieve data from the distributed memory buffer A 312(A), a memory bus 1C 310(1C) that enables the distributed computing node A 302(A) to retrieve data from the distributed computing node B 302(B), and a memory bus 1D 310(1D) that enables the distributed computing node A 302(A) to transmit data to the distributed computing node B 302(B). As another example, as depicted in FIG. 3, the distributed computing node B 302(B) includes a memory bus 2B 310(2B) that enables the distributed computing node B 302(B) to retrieve data from the distributed memory buffer B 312(B), a memory bus 2C 310(2C) that enables the distributed computing node B 302(B) to retrieve data from the distributed computing node A 302(A), and a memory bus 2D 310(2D) that enables the distributed computing node B 302(B) to transmit data to the distributed computing node A 302(A). However, a person of ordinary skill in the relevant technology will recognize that a distributed computing node may include any number of memory busses.

In the distributed architecture 300 of FIG. 3, each distributed memory buffer 312 includes two local memory units 306 each accessible by the distributed memory buffer 312 via a respective local memory controller 308. For example, as depicted in FIG. 3, the distributed memory buffer A 302(A) includes a local memory unit E 306(E) that the distributed memory buffer A 302(A) may access via a local memory controller 3A 308(3A), as well as a local memory unit F 306(F) that the distributed memory buffer A 302(A) may access via a local memory controller 3B 308(3B). As another example, as depicted in FIG. 3, the distributed memory buffer B 302(B) includes a local memory unit G 306(G) that the distributed memory buffer B 302(B) may access via a local memory controller 4A 308(4A), as well as a local memory unit H 306(H) that the distributed memory buffer B 302(B) may access via a local memory controller 4B 308(4B). However, a person ordinary skill in the relevant technology will recognize that a distributed memory buffer may include any number of local memory units and/or any number of local memory controllers.

In the distributed architecture of FIG. 3, each distributed memory buffer 312 includes a memory bus that enables a directly-accessible distributed computing node 302 to retrieve data from the distributed memory buffer 312. For example, as depicted in FIG. 3, the distributed memory buffer A 312(A) includes a memory bus 3A 310(3A) that enables the distributed computing node A 302(A) to retrieve data from the distributed memory buffer A 312(A). As another example, as depicted in FIG. 3, the distributed memory buffer B 312(B) includes a memory bus 4B 310 (4B) that enables the distributed computing node B 302(B) to retrieve data from the distributed memory buffer B 312(B). However, a person of ordinary skill in the relevant technology will recognize that a distributed memory buffer may include any number of memory busses.

The distributed architecture 300 of FIG. 3 is a "non-universal access" architecture. A non-universal architecture may be characterized in part by lack of universal direct access by the distributed computing nodes to the distributed memory buffers, such that at least one distributed computing node may only be able to access data stored by at least one of the distributed memory buffers by using a memory bus associated with another distributed computing node.

For example, as depicted in FIG. 3, the distributed computing node A 302(A) may: (i) access data stored by the distributed memory buffer A 312(A) "directly" via the memory bus 1A 310(1A) associated with the distributed computing node A 302(A) and the memory bus 3A 310(3A) associated with the distributed memory buffer A 312(A), but (ii) access data stored by the distributed memory buffer B 312(B) indirectly via the memory bus 1C 310(1C) associated with the distributed computing node A 302(A), the memory bus 2C 310(2C) associated with the distributed computing node B 302(B), the memory bus 2B 310(2B) associated with the distributed computing node B 302(B), and the memory bus 4B 31 (4B) associated with the distributed memory buffer B 312(B). As another example, as depicted in FIG. 3, the distributed computing node B 302(B) may: (i) access data stored by the distributed memory buffer B 312(B) "directly" via the memory bus 2B 310(2B) associated with the distributed computing node B 302(B) and the memory bus 4A 310(3A) associated with the distributed memory buffer A 312(A), but (ii) access data stored by the distributed memory buffer A 312(A) indirectly via the memory bus 2D 310(2D) associated with the distributed computing node B 302(B), the memory bus 1D 310(1D) associated with the distributed computing node A 302(A), the memory bus 1A 310(1A) associated with the distributed computing node A 302(A), and the memory bus 3A 310(3A) associated with the distributed memory buffer A 312(A).

As depicted in FIG. 3, each link between a local memory controller 308 and a distributed processor 304 is associated with at least one of a latency of T1 or a latency of T1'. However, a person of ordinary skill in the relevant technology will recognize that different controller-processor links may have different latencies. In some cases, T1 is a latency associated with local memory retrieval in a distributed computing node 302 when the distributed architecture 300 is operating in a NUMA mode, while T1' is a latency associated with local memory retrieval in a distributed computing node 302 when the distributed architecture 300 is operating in a UMA mode.

In some cases, T1'=T3+T4+T4+T6, so that the operating system adds a delay to local memory retrieval in a distributed computing node 302 to ensure that the local memory retrieval takes the same time as retrieval of data from a distributed memory buffer that is not directly accessible by the distributed computing node 302. In some cases, the described latency adjustment ensures that, even when a distributed processor retrieves data from a local memory unit, the retrieval takes the same time as retrieval of data from a "farthest" remote memory unit that is not remotely accessible, thus ensuring that the distributed architecture 300 exhibits UMA behavior.

As further depicted in FIG. 3, each link between a local memory controller 308 and a local memory unit 306 is associated with a latency of T2. In some cases, T2 is the latency associated with retrieval of data from a memory unit by the unit's respective memory controller. However, a person of ordinary skill in the relevant technology will recognize that different controller-memory links may have different latencies.

As further depicted in FIG. 3, each link between a distributed processor 304 and a memory bus 310 is associated with a latency of T3. In some cases, T3 is the latency associated with direct retrieval of data from a memory bus by a distributed processor. However, a person of ordinary skill in the relevant technology will recognize that different processor-bus links may have different latencies.

As further depicted in FIG. 3, each link between a memory bus 310 of a distributed computing node 302 and a memory bus 310 of a distributed memory buffer 312 is associated with at least one of a latency of T4 or a latency of T4'. In some cases, T4 is the latency associated with direct retrieval of data associated with a distributed computing node's memory bus by a distributed memory buffer's memory bus while the distributed architecture 300 is operating in the NUMA mode, while T4' is the latency associated with direct retrieval of data associated with a distributed computing node's memory bus by a distributed memory buffer's memory bus while the distributed architecture 300 is operating in the UMA mode. However, a person of ordinary skill in the relevant technology will recognize that different links between bus-bus pairs associated with node-buffer pairs may have different latencies.

In some cases, T4'=T4+T4+T6, so that the operating system adds a delay to data retrieval from a directly-accessible distributed memory buffer 312 to ensure that the data retrieval from the directly-accessible distributed memory buffer 312 takes the same time as a data retrieval from an indirectly-accessible distributed memory buffer 312. In some cases, the described latency adjustment ensures that, even when a distributed processor retrieves data from a directly-accessible distributed memory retrieval, the retrieval takes the same time as retrieval of data from a "farthest" distributed memory buffer that is not remotely accessible, thus ensuring that the distributed architecture 300 exhibits UMA behavior.

As further depicted in FIG. 3, each link between a memory bus 310 and a local memory controller 308 in a distributed memory buffer 312 is associated with a latency of T5. In some cases, T5 is the latency associated with direct retrieval data from a local memory controller by a memory bus. However, a person of ordinary skill in the relevant technology will recognize that different bus-controller links may have different latencies.

As further depicted in FIG. 3, each link between two memory busses 310 of a single distributed computing node 302 may be associated with a latency of T6. However, a person of ordinary skill in the relevant technology will recognize that different bus-bus pairs associated with the same distributed computing node 302 may have different latencies.

Figure 4:
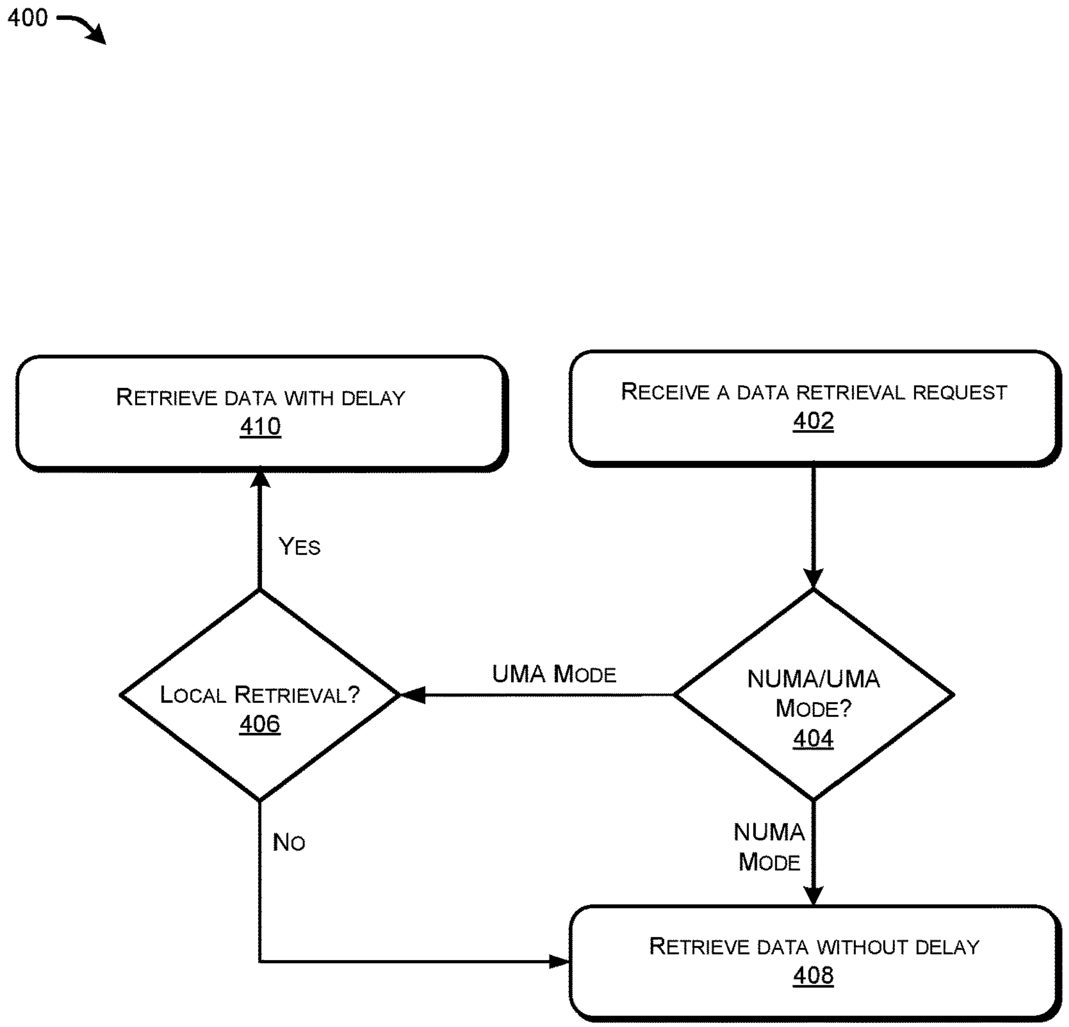
FIG. 4 is a flowchart diagram of an example process for performing data retrieval for a processor of a distributed computing node.

FIG. 4 is a flowchart diagram of an example process 400 for performing data retrieval for a processor of a distributed computing node. The process 400 begins at operation 402 when an operating system associated with the processor receives a data retrieval request. A data retrieval request in a distributed computing system may a request made by a client, application, or a computing node to fetch specific data from the distributed architecture. In some cases, the data retrieval request specifies the location of the data within the distributed system. This location can be represented as an address, a key-value pair, or a file path, depending on the underlying data storage structure. The data retrieval request may specify how the data should be aggregated, merged, or combined before being returned to the requester.

The data retrieval request may specify the desired format or structure of the data to be returned. This could involve data serialization or conversion into specific data types or formats, such as JavaScript Object Notation (JSON), Extensible Markup Language (XML), or a custom data structure. The data retrieval request may specify error handling mechanisms to handle failures, such as node unavailability, network issues, or data corruption. This may involve request retries, fallback options, or returning error messages to inform the requester of the issue.

At operation 404, the operating system determines whether the processor is operating in a NUMA mode or a UMA mode. When operating in the UMA mode, the distributed architecture that includes the processor may mimic the behavior of a UMA memory architecture. UMA may be a memory architecture in which all processors in a multiprocessor system share a common memory pool, and the access time to the memory is uniform across all processors. In some cases, in the UMA mode, each processor can access any memory location with equal latency, regardless of the processor's physical location or the location of the memory. When operating in the NUMA mode, the distributed architecture that includes the processor may mimic the behavior of a NUMA memory architecture. NUMA may be a memory architecture in which memory access times depend on the memory location and the processor accessing the memory. In some cases, in a NUMA memory architecture, each processor has its local memory, which it can access faster than the remote memory associated with other processors.

At operation 406, based on (e.g., in response to) determining that the processor is operating in the UMA mode, the operating system determines whether the data retrieval request requires a local memory retrieval or a remote memory retrieval. A local memory retrieval may be a retrieval from a local memory unit that is local to a distributed computing node of the processor. A remote memory retrieval may be a retrieval from a memory unit that is not local to a distributed computing node of the processor (e.g., that is local to another distributed computing node or to a distributed memory buffer).

At operation 408, based on determining that the processor is operating in the NUMA mode and/or that the data retrieval request requires a remote memory retrieval, the operating retrieves the data without the delay. In some cases, if the corresponding distributed architecture is operating in the NUMA mode, there is no need to ensure that the processor receives local memory retrievals and remote memory retrievals at the same time. In some cases, even if the corresponding distributed architecture is operating in the UMA mode, as long as the data retrieval is from a remote memory location, there is no need to further delay the memory retrieval to ensure that the processor receives local memory retrievals and remote memory retrievals at the same time.

At operation 410, based on determining that the processor is operating in the UMA mode and the data retrieval request requires a local memory retrieval, the operating system retrieves the data from the local memory with a delay. The delay may ensure that the processor receives the target data at the same time as the processor would receive data from a remote memory location.

Figure 5:
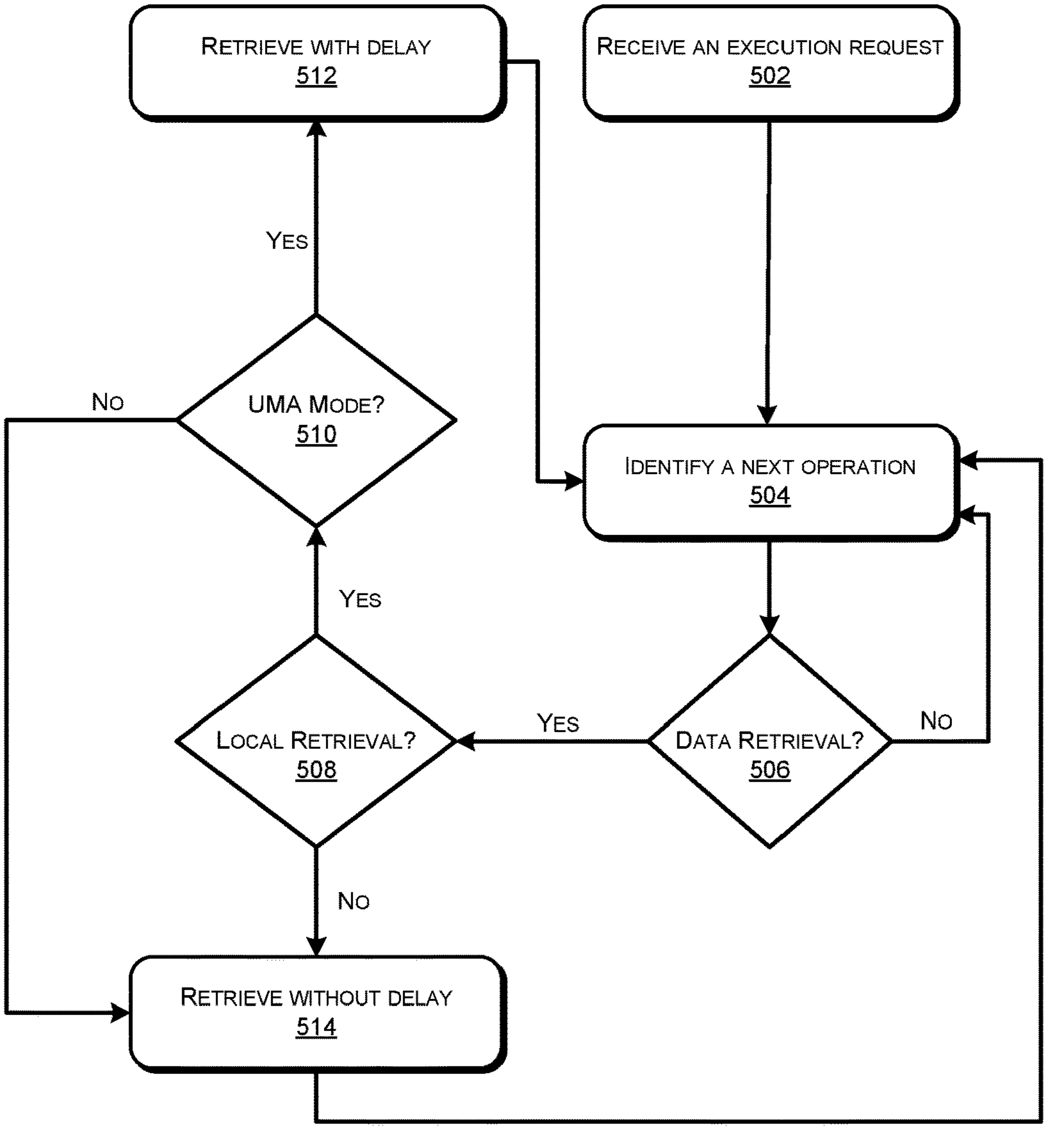
FIG. 5 is a flowchart diagram of an example process for executing a software application using a distributed architecture.

FIG. 5 is a flowchart diagram of an example process 500 for executing a software application using a distributed architecture. The process 500 begins at operation 502 when an operating system associated with the distributed architecture receives a request to execute the software application. The request may specify one or more operations associated with the software application, a distributed computing node and/or a distributed processor for performing each operation, and/or locations of data associated with each operation.

At operation 504, the operating system identifies a next operation of the software application. In some cases, the next operation is the next operation of the software application that is not yet processed by the distributed architecture. In some cases, at the beginning of the execution of the software application using the distributed architecture, the next operation is the initial operation of the software operation.

At operation 506, the operating system determines whether the identified next operation includes a data retrieval. Based on (e.g., in response to) determining that the identified next operation does not include a data retrieval, the operating system may process the identified next operation without a data retrieval and proceed to identify the subsequent operation of the software application.

At operation 508, based on determining that the identified next operation includes a data retrieval, the operating system determines whether the data retrieval includes determines whether the data retrieval request requires a local memory retrieval or a remote memory retrieval. A local memory retrieval may be a retrieval from a local memory unit that is local to a distributed computing node of the processor. A remote memory retrieval may be a retrieval from a memory unit that is not local to a distributed computing node of the processor (e.g., that is local to another distributed computing node or to a distributed memory buffer).

At operation 510, based on determining that the data retrieval request requires a local memory retrieval, the operating system determines whether the distributed architecture is operating in a UMA mode or in a NUMA mode. When operating in the UMA mode, the distributed architecture that includes the processor may mimic the behavior of a UMA memory architecture. UMA may be a memory architecture in which all processors in a multi-processor system share a common memory pool, and the access time to the memory is uniform across all processors. In some cases, in the UMA mode, each processor can access any memory location with equal latency, regardless of the processor's physical location or the location of the memory. When operating in the NUMA mode, the distributed architecture that includes the processor may mimic the behavior of a NUMA memory architecture. NUMA may be a memory architecture in which memory access times depend on the memory location and the processor accessing the memory. In some cases, in a NUMA memory architecture, each processor has its local memory, which it can access faster than the remote memory associated with other processors.

At operation 512, based on determining that the data retrieval request requires a local memory retrieval and that the operating system is operating in the UMA mode, the operating system retrieves the data from the local memory with a delay. The delay may ensure that the processor receives the target data at the same time as the processor would receive data from a remote memory location. In some cases, after the data retrieval, the operating system executes the identified operation based on the retrieved data and proceeds to identify the subsequent operation.

At operation 514, based on determining that the processor is operating in the NUMA mode and/or that the data retrieval request requires a remote memory retrieval, the operating retrieves the data without the delay. In some cases, if the corresponding distributed architecture is operating in the NUMA mode, there is no need to ensure that the processor receives local memory retrievals and remote memory retrievals at the same time. In some cases, even if the corresponding distributed architecture is operating in the UMA mode, as long as the data retrieval is from a remote memory location, there is no need to further delay the memory retrieval to ensure that the processor receives local memory retrievals and remote memory retrievals at the same time. In some cases, after the data retrieval, the operating system executes the identified operation based on the retrieved data and proceeds to identify the subsequent operation.

FIG. 6 provides an operational example of a data structure 600 that represents a software application with some operations performed in the NUMA mode and other operations performed in the UMA mode. The data structure 600 includes two arrays, one for operations performed in NUMA mode and another for operations performed in UMA mode. The numa_operations array contains objects that represent each operation, with properties including operation_name, memory_node, and processor_node. The operation_name may be a string that represents the name of the operation, memory_node may be an integer that represents the memory node where the operation is performed, and processor_node i may be s an integer that represents the processor node where the operation is performed. The uma_operations array may also include objects that represent each operation, with properties including operation_name and processor_core. The operation_name may be a string that represents the name of the operation, and processor_core may be an integer that represents the processor core where the operation is performed. Additionally, the data structure may include a string application_name that represents the name of the application.

Figure 7:
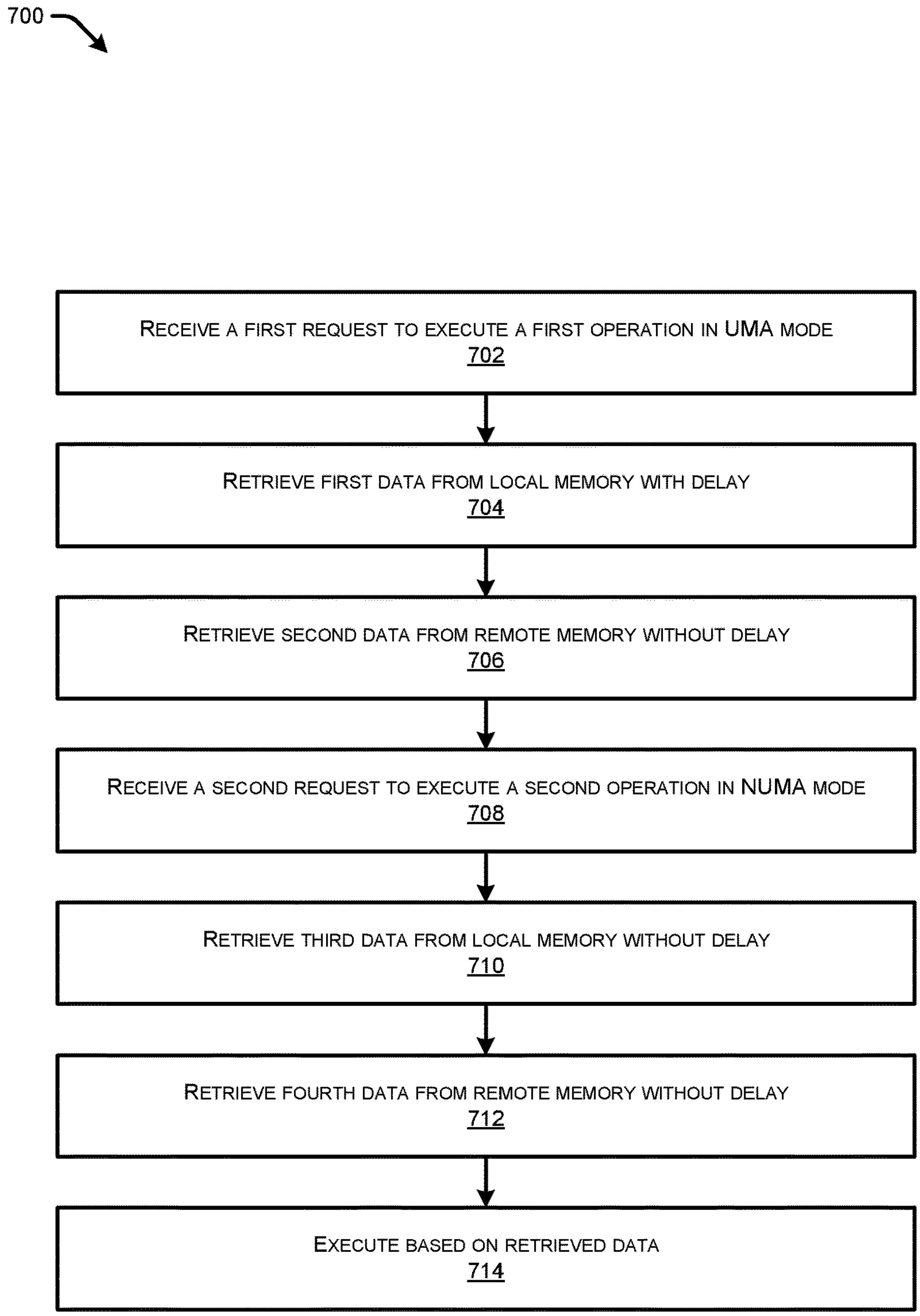
FIG. 7 is a flowchart diagram of an example process for executing a software application using a distributed architecture.

FIG. 7 is a flowchart diagram of an example process 700 for executing a software application using a distributed architecture. The distributed architecture may include a first processor, a first memory that is local to the first processor, and a second memory that is remote to the first processor. At operation 702, the process 700 includes receiving a first request to execute a first operation using a distributed architecture and in a uniform memory access (UMA) mode.

At operation 704, the process 700 includes retrieving first data associated with the first operation from the first memory. In some cases, operation 704 includes, subsequent to receiving the first request and a first delay period, transmitting first data associated with the first operation to the first processor, where the first data is stored in the first memory. In some cases, the first delay period is determined based on: (i) a first latency associated with transmission of data stored in the first memory to the first processor, and (ii) a second latency associated with transmission of data stored in the second memory to the first processor.

At operation 706, the process 700 includes retrieving second data associated with the first operation from the second memory. In some cases, operation 706 includes, subsequent to receiving the first request, transmitting second data associated with the first operation to the first processor, wherein the second data is stored in the second memory.

At operation 708, the process 700 includes receiving a second request to execute a second operation using the distributed architecture and in a non-uniform memory access (NUMA) mode.

At operation 710, the process 700 includes retrieving third data associated with the second operation from the first memory. In some cases, operation 710 includes, subsequent to receiving the second request, transmitting third data associated with the second operation to the first processor, wherein the third data is stored in the first memory.

At operation 712, the process 700 includes retrieving fourth data associated with the second operation from the second memory. In some cases, operation 712 includes, subsequent to receiving the second request, transmitting fourth data associated with the second operation to the first processor, wherein the fourth data is stored in the second memory.

At operation 714, the process 700 includes executing the software application based on the retrieved data. In some cases, operation 714 includes processing the first data and the second data based on the first operation and the third data and the fourth data based on the second operation.

Figure 8:
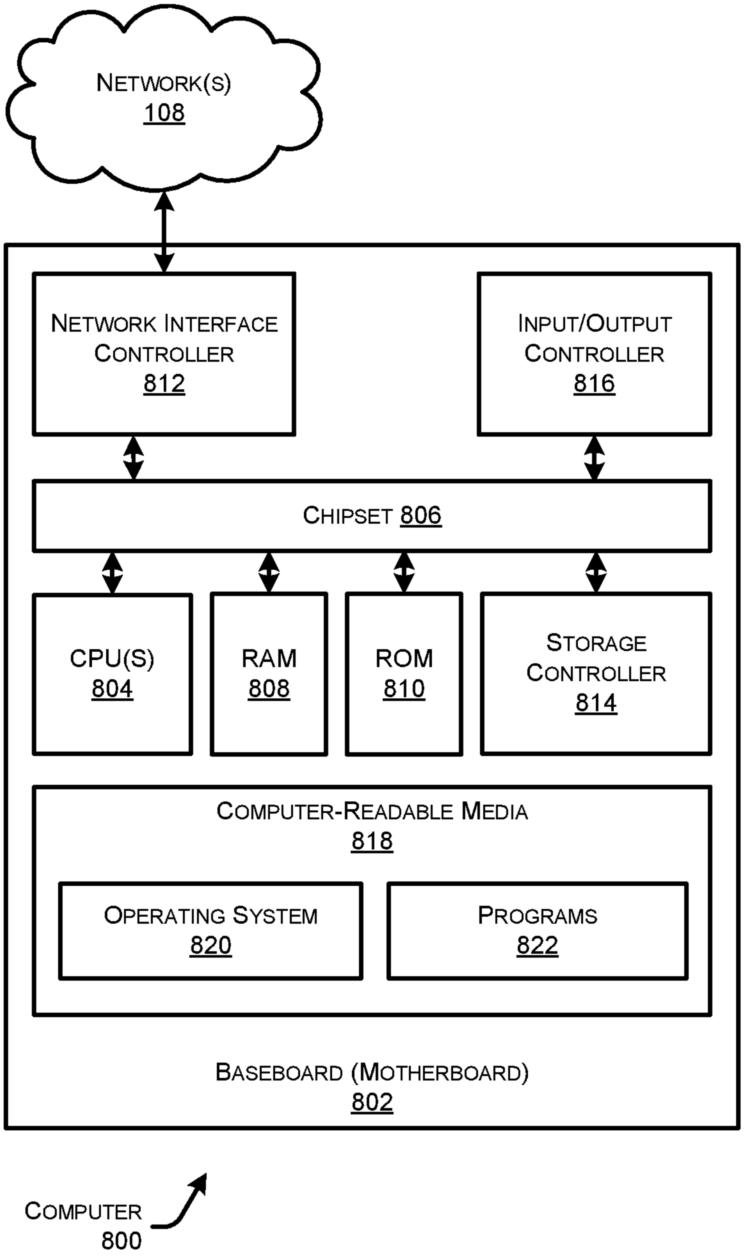
FIG. 8 shows an example computer architecture for a computer capable of executing program components for implementing the functionality described above.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a distributed computing node in a distributed computing system.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations are performed by devices in a distributed application architecture, and or any components included therein, may be supported by one or more devices similar to computer 800. Stated otherwise, some or all of the operations performed by the distributed computing system 102, and or any components included therein, may be performed by one or more computer devices 800 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving a first request to execute a first operation using a distributed architecture and in a uniform memory access (UMA) mode, wherein the distributed architecture comprises a first processor, a first memory that is local to the first processor, and a second memory that is remote to the first processor;

subsequent to receiving the first request and a first delay period, transmitting first data associated with the first operation to the first processor, wherein the first data is stored in the first memory, wherein the first delay period is imposed on transmitting the first data based on determining that the distributed architecture is in the UMA mode and the first data is stored in the first memory; and subsequent to receiving the first request, transmitting second data associated with the first operation to the first processor, wherein the second data is stored in the second memory.

2. The method of claim 1, further comprising:

receiving a second request to execute a second operation using the distributed architecture and in a non-uniform memory access (NUMA) mode;

subsequent to receiving the second request, transmitting third data associated with the second operation to the first processor, wherein the third data is stored in the first memory; and subsequent to receiving the second request, transmitting fourth data associated with the second operation to the first processor, wherein the fourth data is stored in the second memory.

3. The method of claim 1, further comprising:

at a second time that is distinct from a first time associated with the first request, receiving a third request to execute the first operation using the distributed architecture and in a NUMA mode;

subsequent to receiving the third request, transmitting fifth data associated with the first operation to the first processor, wherein the fifth data is stored in the first memory; and subsequent to receiving the third request, transmitting sixth data associated with the first operation to the first processor, wherein the sixth data is stored in the second memory.

4. The method of claim 1, wherein the first delay period is determined based on: (i) a first latency associated with transmission of data stored in the first memory to the first processor, and (ii) a second latency associated with transmission of data stored in the second memory to the first processor.

5. The method of claim 1, wherein the distributed architecture further comprises a first memory buffer.

6. The method of claim 5, further comprising:

subsequent to receiving the first request, transmitting seventh data associated with the first operation to the first processor, wherein the seventh data is stored in the second memory.

7. The method of claim 1, wherein:

the distributed architecture further comprises a first memory buffer, a second memory buffer, and a second processor, the first processor is configured to retrieve data from the first memory buffer using a first memory access bus associated with the first processor and the first memory buffer, and the second processor is configured to retrieve data from the second memory buffer using a second memory access bus associated with the first processor and the second processor and a third memory access bus associated with the second processor and the second memory buffer.

8. The method of claim 7, further comprising:

subsequent to receiving the first request and a second delay period, transmitting eighth data associated with the first operation to the first processor, wherein the eighth data is stored in the first memory buffer; and subsequent to receiving the first request, transmitting ninth data associated with the first operation to the first processor, wherein the ninth data is stored in a memory attached to the second memory buffer.

9. The method of claim 1, wherein:

a first application comprises the first operation and one or more second operations; and each operation of the first application is executed using the UMA mode.

10. The method of claim 1, wherein:

a first application comprises the first operation and a second operation; and the second operation is executed using a non-uniform memory access (NUMA) mode.

11. The method of claim 2, wherein transmitting the second data is performed without imposing the first delay period based on determining that the second data is stored in the second memory.

12. The method of claim 11, wherein transmitting the third data and transmitting the fourth data are performed without imposing the first delay period based on determining that the distributed architecture is in the NUMA at a time associated with the second request.

13. A system comprising:

one or more processors; and one or more non-transitory computer-readable media storing computer-executable instructions that, when executed by the one or more processors, cause the one or more processors to perform operations comprising:

receiving a first request to execute a first operation using a distributed architecture and in a uniform memory access (UMA) mode, wherein the distributed architecture comprises a first processor, a first memory that is local to the first processor, and a second memory that is remote to the first processor-;

subsequent to receiving the first request and a first delay period, transmitting first data associated with the first operation to the first processor, wherein the first data is stored in the first memory, wherein the first delay period is imposed on transmitting the first data based on determining that the distributed architecture is in the UMA mode and the first data is stored in the first memory; and subsequent to receiving the first request, transmitting second data associated with the first operation to the first processor, wherein the second data is stored in the second memory.

14. The system of claim 13, the operations further comprising:

receiving a second request to execute a second operation using the distributed architecture and in a non-uniform memory access (NUMA) mode;

subsequent to receiving the second request, transmitting third data associated with the second operation to the first processor, wherein the third data is stored in the first memory; and subsequent to receiving the second request, transmitting fourth data associated with the second operation to the first processor, wherein the fourth data is stored in the second memory.

15. The system of claim 13, the operations further comprising:

at a second time that is distinct from a first time associated with the first request, receiving a third request to execute the first operation using the distributed architecture and in a NUMA mode;

subsequent to receiving the third request, transmitting fifth data associated with the first operation to the first processor, wherein the fifth data is stored in the first memory; and subsequent to receiving the third request, transmitting sixth data associated with the first operation to the first processor, wherein the sixth data is stored in the second memory.

16. The system of claim 13, wherein the first delay period is determined based on: (i) a first latency associated with transmission of data stored in the first memory to the first processor, and (ii) a second latency associated with transmission of data stored in the second memory to the first processor.

17. The system of claim 13, the operations further comprising:

the distributed architecture further comprises a first memory buffer, a second memory buffer, and a second processor, the first processor is configured to retrieve data from the first memory buffer using a first memory access bus associated with the first processor and the first memory buffer, and the second processor is configured to retrieve data from the second memory buffer using a second memory access bus associated with the first processor and the second processor and a third memory access bus associated with the second processor and the second memory buffer.

18. One or more non-transitory computer-readable media storing computer-executable instructions that, when executed by one or more processors, cause the one or more processors to perform operations comprising:

receiving a first request to execute a first operation using a distributed architecture and in a uniform memory access (UMA) mode, wherein the distributed architecture comprises a first processor, a first memory that is local to the first processor, and a second memory that is remote to the first processor;

subsequent to receiving the first request and a first delay period, transmitting first data associated with the first operation to the first processor, wherein the first data is stored in the first memory, wherein the first delay period is imposed on transmitting the first data based on determining that the distributed architecture is in the UMA mode and the first data is stored in the first memory; and subsequent to receiving the first request, transmitting second data associated with the first operation to the first processor, wherein the second data is stored in the second memory.

19. The one or more non-transitory computer-readable media of claim 18, the operations further comprising:

receiving a second request to execute a second operation using the distributed architecture and in a non-uniform memory access (NUMA) mode;

subsequent to receiving the second request, transmitting third data associated with the second operation to the first processor, wherein the third data is stored in the first memory; and subsequent to receiving the second request, transmitting fourth data associated with the second operation to the first processor, wherein the fourth data is stored in the second memory.

20. The one or more non-transitory computer-readable media of claim 18, the operations further comprising:

at a second time that is distinct from a first time associated with the first request, receiving a third request to execute the first operation using the distributed architecture and in a NUMA mode;

subsequent to receiving the third request, transmitting fifth data associated with the first operation to the first processor, wherein the fifth data is stored in the first memory; and subsequent to receiving the third request, transmitting sixth data associated with the first operation to the first processor, wherein the sixth data is stored in the second memory.

* * * * *